United States Patent [19]

Lyster

[11] 4,216,607

[45] Aug. 12, 1980

[54] CRAB-SNARING DEVICE

[76] Inventor: Edmund F. Lyster, Box 14960, Highway 101 South, Rockaway, Oreg. 97136

[21] Appl. No.: 28,103

[22] Filed: Apr. 9, 1979

[51] Int. Cl.³ .............................................. A01K 69/06
[52] U.S. Cl. ........................................ 43/87; 43/42.7; 43/100
[58] Field of Search ................... 43/42.7, 86, 87, 100, 43/102

[56] References Cited

U.S. PATENT DOCUMENTS

| | | | |
|---|---|---|---|
| 2,565,163 | 8/1951 | Ball | 43/43.1 |
| 2,656,642 | 10/1953 | Richa | 43/100 |
| 3,815,276 | 6/1974 | Harrison | 43/42.7 |
| 4,083,142 | 4/1978 | Gregerson | 43/87 |

*Primary Examiner*—Nicholas P. Godici
*Attorney, Agent, or Firm*—Klarquist, Sparkman, Campbell, Leigh, Hall & Whinston

[57] ABSTRACT

The specification discloses a crab-snaring device including a steel ring to which a bait-holder in the form of a fishhook is attached and which is adapted to have a fishing line from a fishing rod tied thereto. A plurality of snares formed by semi-stiff monofilament lines are secured to the ring at spaced points, and in tight frictional engagement and each of these lines is formed into a snare which is angular to the ring. When a crab is pulling on the bait, the person holding the pole feels the pull and pulls the ring to tighten the snares on any legs of the crab (or crabs) extending through the snares to pull the crab up.

2 Claims, 3 Drawing Figures

U.S. Patent    Aug. 12, 1980    4,216,607
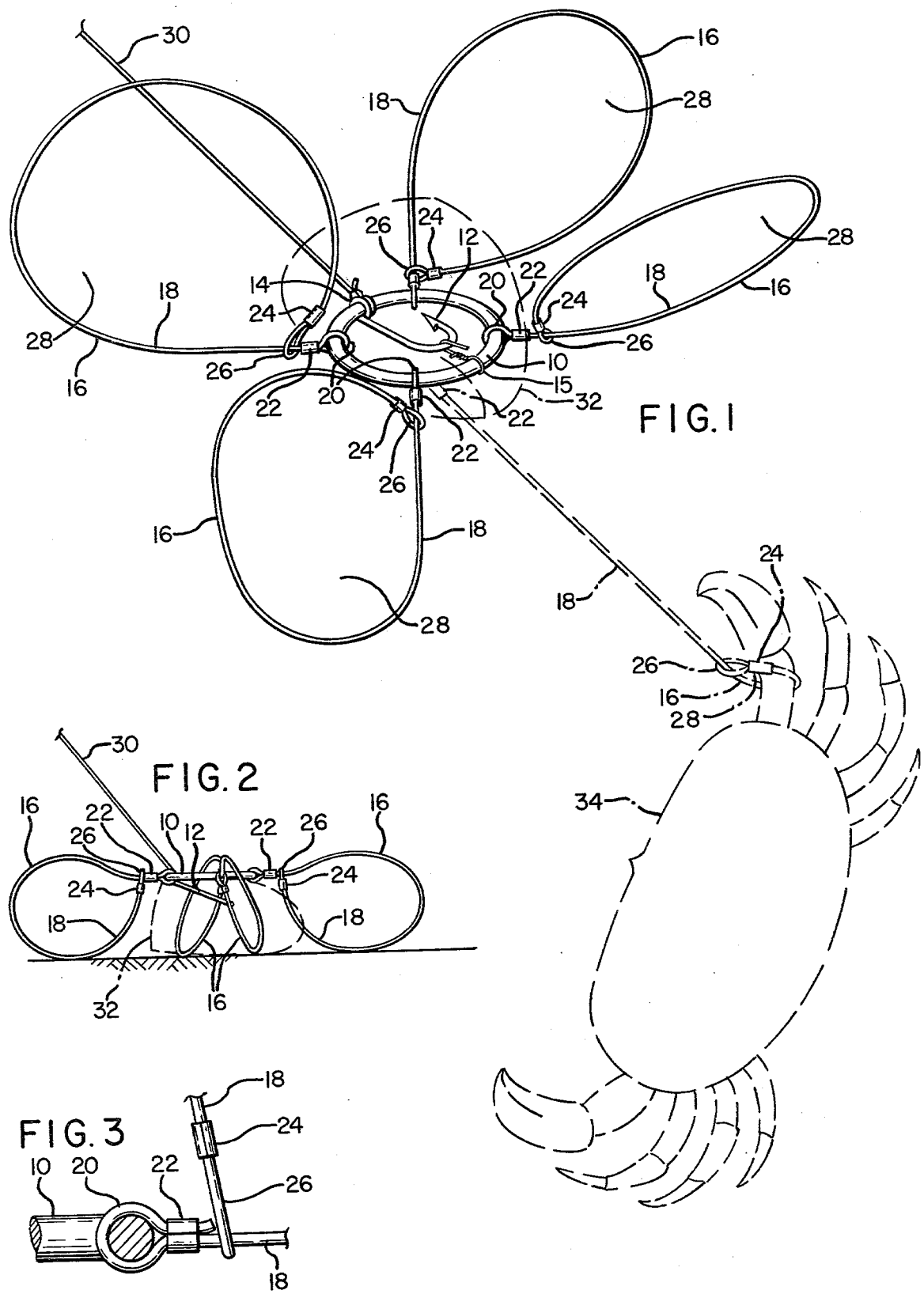

CRAB-SNARING DEVICE

DESCRIPTION

This invention relates to a crab-snaring device and has for an object thereof the provision of a new and improved crab-snaring device.

Another object of the invention is to provide a crab-snaring device adapted to be used with a fishing line.

A further object of the invention is to provide a crab-snaring device having a plurality of snares.

Another object of the invention is to provide a crab-snaring device which positions snares on the bottom of a bay.

The invention provides a crab-snaring device including a bait-holder and a snare secured to the bait-holder.

In the drawings:

FIG. 1 is a perspective view of a crab-snaring device forming one embodiment of the invention; and, FIG. 2 is a perspective view of the crab-snaring device of FIG. 1 with a crab snared thereby.

A crab-snaring device forming a specific embodiment of the invention includes a steel ring 10 serving as a connector and a weight. A fishhook 12 having an eye 14 secured to the ring acts as a bait-holder to hold crab bait such as, for example, a fish head. The hook 12 is preferably mounted so that it lies flat in the plane of the ring when the device is not in use minimizing snagging of the hook and facilitating handling and storage. A soft copper wire 15 may be provided to be bent around the hook bight and held in the plane of the ring for storage (see FIG. 1). Four snares 16 are attached to the ring about 90° apart. The snares are formed of a length of a resilient material that is normally straight so that when bent to form a loop, the loop will remain open until tightened. The snares are preferably formed of nylon-monofilament such as, for example, that used by ocean trollers and being about two hundred and fifty-pound test. Each snare has an attaching eye 20 in frictional engagement with the ring tight enough to firmly grip the ring and hold the position of the snare on the ring against accidental displacement, but permitting manual adjustment of the position. Clamps 22 form the eyes 20 and similar clamps 24 clamp the outer ends of the lines 18 into sliding eyes 26 loosely surrounding the lines 18 to form into sliding eyes 26 loosely surrounding the lines 18 to form snaring loops 28 normally open in generally elliptical shape, a minor axis of about three-and-one-half inches and a major axis of about four-and-one-half inches being a very satisfactory size for snaring Dungeness crabs. Preferably each eye 26 is formed with such twist in the line 18 that the loop lies at an angle of 30° to 90° to the plane of the ring 10. This insures that the loops do not lie flat on the bay bottom, but extend about the bottom so that crabs get their legs readily through the loop. The bait, which is usually thick, will hold the ring up off the bottom (see FIG. 2) so the loops will not lie flat on the bottom.

In operation, the user unbends the keeper wire 15 from the hook and attaches the ring 10 to a line so that it may be retrieved. This may be a hand line or a line of a fishing rod and reel. After fixing a bait, such as a fish head 33, the hook 12, the ring and bait are cast out into the bay or ocean. One of the advantages of the device is that it may be easily cast from the shore or pier or jetty into water that crabs inhabit and similarly easily retrieved, hopefully with a crab or crabs. When the crab works on the bait, it will usually get some of its legs through at least one of the snares 16, and in pulling on the bait, indicates its presence to the crabber by a pull on the line 30 tied to the ring 10. The crabber then pulls the crab-snaring device toward him. This tightens the snare or snares 16 on the legs of the crab and pulls the crab to the crabber. It will be appreciated that the above-described snaring device will also be effective to catch lobsters and other forms of sea life.

What is claimed is:

1. A crab snaring device comprising a ring of sufficient weight to facilitate its being cast with a fishing rod;

a plurality of snares mounted on said ring, each comprising a length of relatively stiff, normally straight monofilament line gripping the ring at one end, the other end of each said length being slidably secured to the bight of the respective length of line whereby the tendency of said line to assume its normal, straight condition will cause each said line to maintain an open loop; and means on said ring for securing a bait thereto.

2. The device of claim 1 wherein each said other end of said length of line are secured to said bights in such manner that the loop formed therein lies in a plane at an angle relative to the plane of the ring.

* * * * *